(12) United States Patent
Chen et al.

(10) Patent No.: US 7,742,651 B2
(45) Date of Patent: Jun. 22, 2010

(54) METHOD AND APPARATUS FOR ENHANCING DETAIL IN AN IMAGE

(75) Inventors: Keping Chen, Sacramento, CA (US); Jurica Ivisic, Cambridge (CA); Ronald Edward Alspaugh, Sequim, WA (US)

(73) Assignee: Thomson Licensing, Boulogne-Billancourt (FR)

( * ) Notice: Subject to any disclaimer, the term of this patent is extended or adjusted under 35 U.S.C. 154(b) by 1183 days.

(21) Appl. No.: 10/817,983

(22) Filed: Apr. 5, 2004

(65) Prior Publication Data

US 2004/0252908 A1 Dec. 16, 2004

Related U.S. Application Data

(60) Provisional application No. 60/460,648, filed on Apr. 4, 2003.

(51) Int. Cl.
*G06K 9/40* (2006.01)
(52) U.S. Cl. .................. 382/260; 348/E5.076
(58) Field of Classification Search ........... 382/254, 382/260, 276; 348/E5.076
See application file for complete search history.

(56) References Cited

U.S. PATENT DOCUMENTS 5,204,919 A * 4/1993 Murakami .............. 382/263
5,774,599 A * 6/1998 Muka et al. ............. 382/254
5,796,873 A * 8/1998 Deane .................... 382/254
6,014,468 A * 1/2000 McCarthy et al. ........ 382/254
6,064,775 A * 5/2000 Suzuki et al. ............ 382/254
6,360,021 B1 * 3/2002 McCarthy et al. ........ 382/254
6,442,301 B1 * 8/2002 Edgar ..................... 382/275
6,847,738 B1 * 1/2005 Scognamiglio et al. .... 382/260
6,996,286 B2 * 2/2006 Dolazza .................. 382/260

* cited by examiner

*Primary Examiner*—Bhavesh M Mehta
*Assistant Examiner*—Stephen R Koziol
(74) *Attorney, Agent, or Firm*—Robert D. Shedd; Robert B. Levy

(57) ABSTRACT

The detail in an image can be enhanced by selective filtering to separate at least one part of the frequency spectrum of the image from a remaining part of the image. The amplitude of the separated part of the frequency spectrum of image is changed and the amplitude-changed portion is combined with the remaining part of the image. The filtering and/or the change in amplitude is controlled at least in part in response to the content of the image to enhance the detail level of the image where appropriate, while preventing enhancement in areas of the picture where it is likely that artifacts would be generated.

20 Claims, 4 Drawing Sheets

METHOD AND APPARATUS FOR ENHANCING DETAIL IN AN IMAGE

CROSS-REFERENCE TO RELATED APPLICATIONS

This application claims priority under 35 U.S.C. 119(e) to U.S. Provisional Patent Application Ser. No. 60/460,648 filed Apr. 4, 2003, the teachings of which are incorporated herein.

TECHNICAL FIELD

This invention relates to a technique to enhancing detail in an image.

BACKGROUND ART

A single static image, or one of a sequence of images representing a moving scene, such as a video sequence, can lack detail, and appear "flat" or "soft". Sometimes, this is a characteristic of the original image; for example, the scene lacks contrast or the lighting could have been very diffuse, resulting in an image with a low level of detail information. Significant loss of detail can also result from roll-off of high spatial frequencies caused by the finite aperture of the optical imaging system. In other cases, an image of adequate quality can be degraded by a transmission or coding system, resulting in loss of detail. Examples include transmission paths with high-frequency loss, or coding with composite television systems such as NTSC, PAL, or SECAM. Another example of coding that can reduce detail is compression, using a compression technique such as JPEG or MPEG.

Clearly, an image that lacks or has lost detail is inferior to one with an appropriate level of detail. However, more important than the actual loss of detail is the result that the image can appear "flat" or "lackluster." A television viewer often will reject such an image in favor of a different program that contains images having greater detail.

Detail in an image can be enhanced by increasing the gain of the high spatial frequencies, but a simple system that increases detail by simply increasing the gain method will risk creating overshoots and ringing, that can introduce visible and objectionable artifacts. An image processed in such a manner will have a higher level of detail. However, such an image will likely be perceived as inferior by a viewer because of the presence of such artifacts.

Thus, there is a need for a technique to increase the detail and subjective appeal of an image without producing objectionable artifacts.

SUMMARY OF THE INVENTION

Briefly, in accordance with a preferred embodiment of the present invention, there is provided a method for improving the appearance of an image having insufficient detail. The method commences by first separating at least one part of frequency spectrum of the image. The amplitude of the one part of the frequency spectrum is changed and the changed part of the frequency spectrum of the image is recombined with the remaining frequency spectrum. The separation of the one part of the frequency spectrum and the change in amplitude is controlled at least in part in response to the content of the image to enhance the detail level of the image where appropriate, while preventing enhancement in areas of the picture where it is likely that artifacts would be generated.

DETAILED DESCRIPTION

Figure 1:
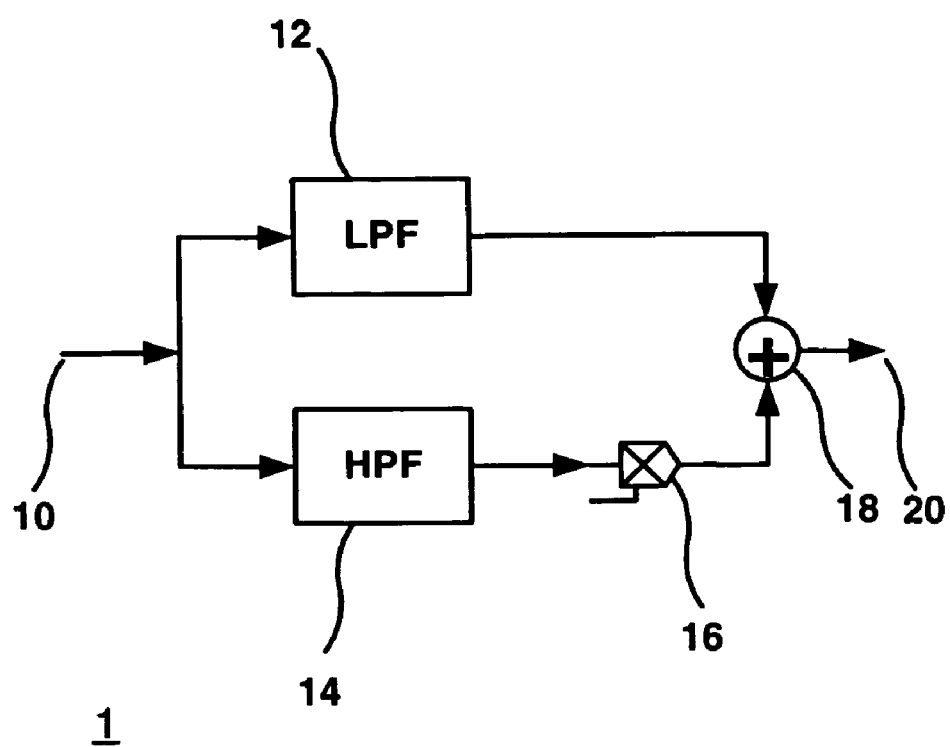
FIG. 1 depicts a prior art method for changing the high frequency content of an image.

FIG. 1 depicts a prior art circuit 1 for changing the high frequency content of a signal 10, such as a video signal containing one or more images. To that end, the term "image", as used herein refers to either a single image, or a sequence of images. The video signal 10 is applied to the input of both a low pass filter 12 and a high pass filter 14. Ideally, the filters 12 and 14 are complementary such that the sum of the output signals would exactly equal the input signal. The output of high-pass filter 14 undergoes amplification by a variable gain amplifier 16. The output of amplifier 16 and the output of low-pass filter 12 are both inputs to an adder 18, which produces an output signal 20. If the gain of amplifier 16 is set to unity, the output signal 20 remains essentially the same as the video signal 10 assuming the filters 12 and 14 have sufficient accuracy. If the gain of amplifier 16 is set to a value higher than unity, the output signal 20 will have a greater contribution from the high-pass filter 14, and so fine detail in the image contained in the video signal 10 will be enhanced.

Figure 2:
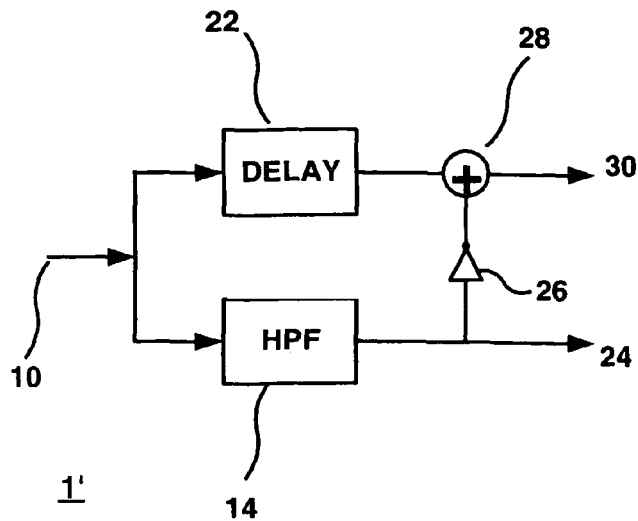
FIG. 2 depicts a prior art alternative method of implementing the complementary high- and low-pass filters shown in FIG. 1.

In another prior art arrangement, the two filters 12 and 14 of FIG. 1 can be replaced by a single filter and a subtraction mechanism as depicted in the prior art circuit 1' of FIG. 2. With the circuit 1' of FIG. 2, which is particularly suitable for digital signals, the video signal 10 is applied to the input of a high pass filter 14, and to the input of a delay element 22 having a delay equal to that of the filter 14. The output of delay element 22 is applied to one terminal of an adder 28. The output signal 24 of high-pass filter 14 provides the required high-frequency part of the video signal 10. The signal 24 undergoes inversion by an inverter 26 before being applied to a second input of an adder circuit 28. The output signal 30 of adder circuit 28 represents the difference between the original signal 10 and the high-frequency part of the signal 24 produced by the high-pass filter 14. Accordingly, the signal 30 produced by the adder 28 represents the low-frequency part of the original signal 10. If the precision is sufficient, the sum of the high-frequency signal 24 and the low-frequency signal 30 will exactly equal the original signal 10. An implementation of this type is often desirable in the present context because it ensures that when no correction is applied, the original signal remains unchanged. Signals 24 and 30 can be combined in a variable ratio using the combination of a variable gain amplifier and adder similar to that of the circuit 1 of FIG. 1.

Simpler implementations of the prior-art circuit 1 of FIG. 1 need not use a low-pass filter. In such systems the output of variable-gain amplifier is added to a suitably delayed version of the original signal 10.

Figure 3A:
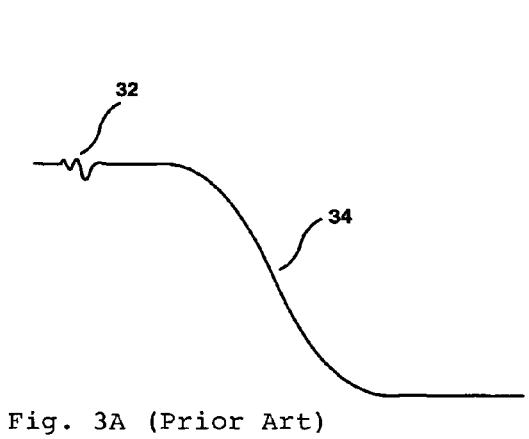
FIG. 3A depicts a portion of an incoming video signal having a low-level detail portion and a large excursion.
Figure 3B:
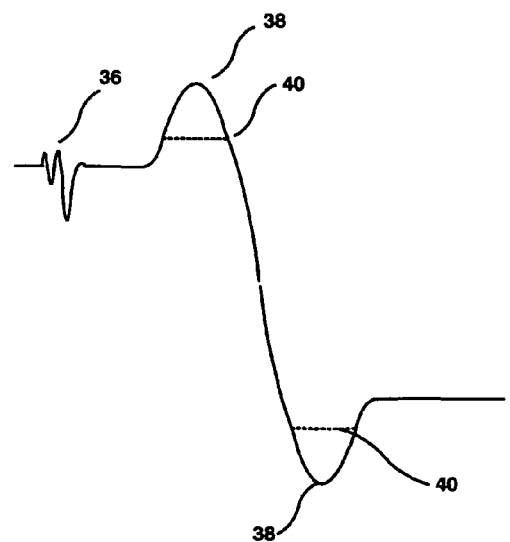
FIG. 3B depicts a the incoming video signal portion of FIG. 3A following a conventional high-frequency boost.

The prior-art circuit 1 of FIG. 1 suffers from a severe limitation in that the degree of enhancement is fixed and is not dependent on the content of the image, or the characteristics of the video signal containing the image. This disadvantage of the prior art circuit 1 of FIG. 1 becomes readily apparent by reference to the signal edge depicted in FIG. 3A. If the video signal 10 has a low-level detail, as represented by the transition 32 and excursion 34, both shown in FIG. 3A, the high-frequency boost applied by the circuit 1 of FIG. 1 can provide a desired enhancement of low-level detail. Such an enhancement appears as an increased amplitude transition 36 in FIG. 3B, but results in substantial overshoots, as represented by the large excursions 38 in FIG. 3B. These overshoots, rather than enhancing the subjective appearance of the image, are likely to produce severe visible artifacts such as ringing that would impair the subjective quality. Further degradation will typically result from subsequent processing, and in particular, clipping of the overshoots, representing by the dashed lines 40 in FIG. 3B, resulting in additional artifacts.

Figure 4:
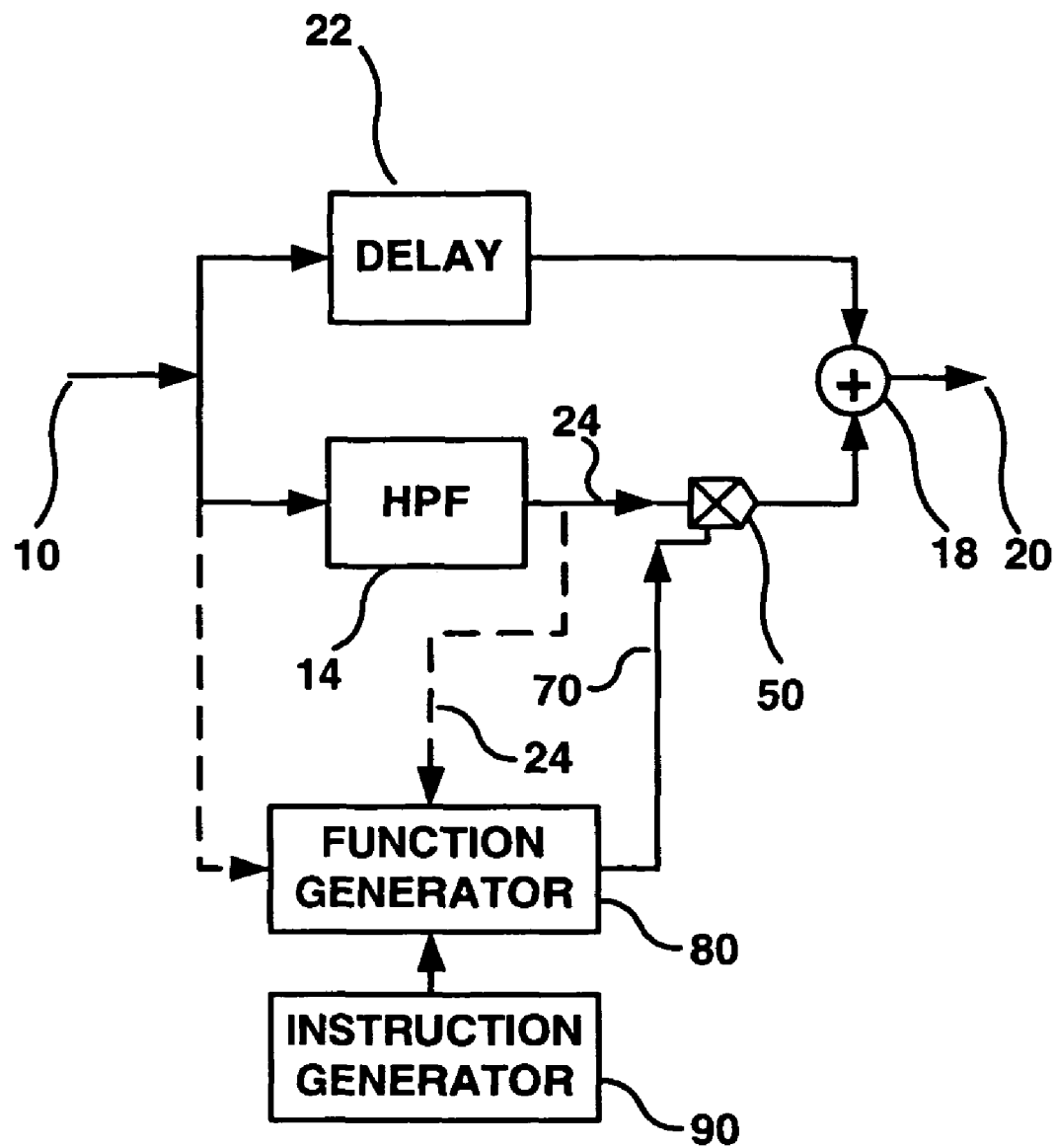
FIG. 4 depicts a first exemplary embodiment of a detail enhancement circuit in accordance with the present principles for performing frequency-selective enhancement in response to image content.

FIG. 4 depicts a first illustrative embodiment 100 of a detail enhancement circuit in accordance with the present principles for providing high frequency enhancement of an incoming video signal 10 while overcoming the disadvantages of the prior-art circuit 1 of FIG. 1. The circuit 100 of FIG. 4 includes several of the same components as the prior art circuit 1 of FIG. 1 and therefore like reference numerals have been used to describe like elements. For example, the circuit 100 of FIG. 4 includes a high-pass filter 14 and a delay element 22 both supplied at their respective inputs with the incoming video signal 10. An adder 18 receives at a first input the output of the delay element whereas the second input of the adder receives the output of an element 50. The element 50 typically comprises a variable gain amplifier, a fixed or variable attenuator, or a switch, which is controlled to pass, or to not pass, the output signal 24 of the high-pass filter 14.

In a simple implementation, the element 50 has two states. In one state, the output signal of the element 50 constitutes some preset multiple (usually less than unity) of the high-pass filter output signal 24. In its other state, the output signal produced by the element 50 is zero. The output signal (if present) of the element 50 is added to an appropriately delayed version of the original signal 10 by the adder 18. Thus, the adder 18 adds an enhancement to the original signal according to the state of the element 50.

It should be noted that an alternative circuit arrangement could provide an equivalent result. For example, a preset level of signal 24 could be added to an appropriately delayed version of the original signal 10, creating an enhanced version of the signal. A switch (not shown) could then select between the enhanced and non-enhanced versions of the signal as determined by the control system.

The state of element 50 is controlled by the combination of Function Generator 80 and Instruction Generator 90. The Function Generator 80 and Instruction Generator 90 are shown separately for ease of description. In a practical implementation, these elements could be combined in a single system, or could be implied by the design and/or choice of components for other parts of the circuitry. The Function Generator 80 produces a control signal 70 responsive to the content of the image. The Instruction Generator 90 is an optional element that can control the behavior of Function Generator 80 in response to commands from an operator and/or from other parts of the system. Such commands could be as simple as on/off control of the enhancement function. Other implementations might use logic and/or fuzzy logic to modify the behavior of the Function Generator 80 in response to a simple or complex analysis based upon inputs from one or more parts of a system.

The Function Generator 80 receives image information, either in the form of the input video signal 10, and/or the high-pass filter output signal 24. With the addition of suitable internal or external delay elements (not shown), the function Generator 80 could also receive modified or unmodified information from preceding or succeeding images in an image sequence, in addition to, or in place of one or both of the signals 10 and 24. The Function Generator 80 can also contain filtering or other image analysis mechanisms that are not part of the main signal path.

The Function Generator 80 provides a control signal 70, responsive to instructions received from Instruction Generator 90, and/or derived from one or more of its input signals. The Control signal 70 can vary spatially and/or temporally, and can comprise multiple elements for the control of 1-, 2-, or 3-dimensional filters. Using a simple control algorithm, the Function Generator 80 could compare the absolute instantaneous value of the output signal 24 of the high-pass filter 14 with a threshold level pre-determined by the design of the Function generator. Alternatively, the threshold level could be determined in response to an instruction from the Instruction Generator 90 in response to operator input or other decision factors. When the high-frequency content is below the threshold level, the control signal 70 will cause the element 50 to pass a higher level of the detail-enhanced version of the video signal 10. However, when there is a high level of high-frequency content present in the image signal, such as in the vicinity of a sharp transition, such as transition 34 in FIG. 3A, the output signal 24 of the high-pass filter 14 will exceed the threshold level. Under such circumstances, the Function Generator 80 will cause the element 50 to pass the non-enhanced version of the signal. In this way, the detail enhancement circuit 100 of FIG. 4 enhances the detail level of the image where appropriate, but prevents enhancement in areas of the picture where it is likely that artifacts would be generated.

For ease of description, the detail enhancement circuit 100 of FIG. 4 has been depicted as including a single high-pass filter 24, but other embodiments could use more a sophisticated filter structure to select one or more sub-bands of the image spectrum. Such a filter stricture could include a 1-dimensional filter (horizontal, vertical, or temporal), a diagonal, 2-dimensional filter (with some combination of horizontal, vertical, and temporal elements), or a 3-dimensional filter (with some combination of horizontal, vertical, and temporal elements).

Figure 5:
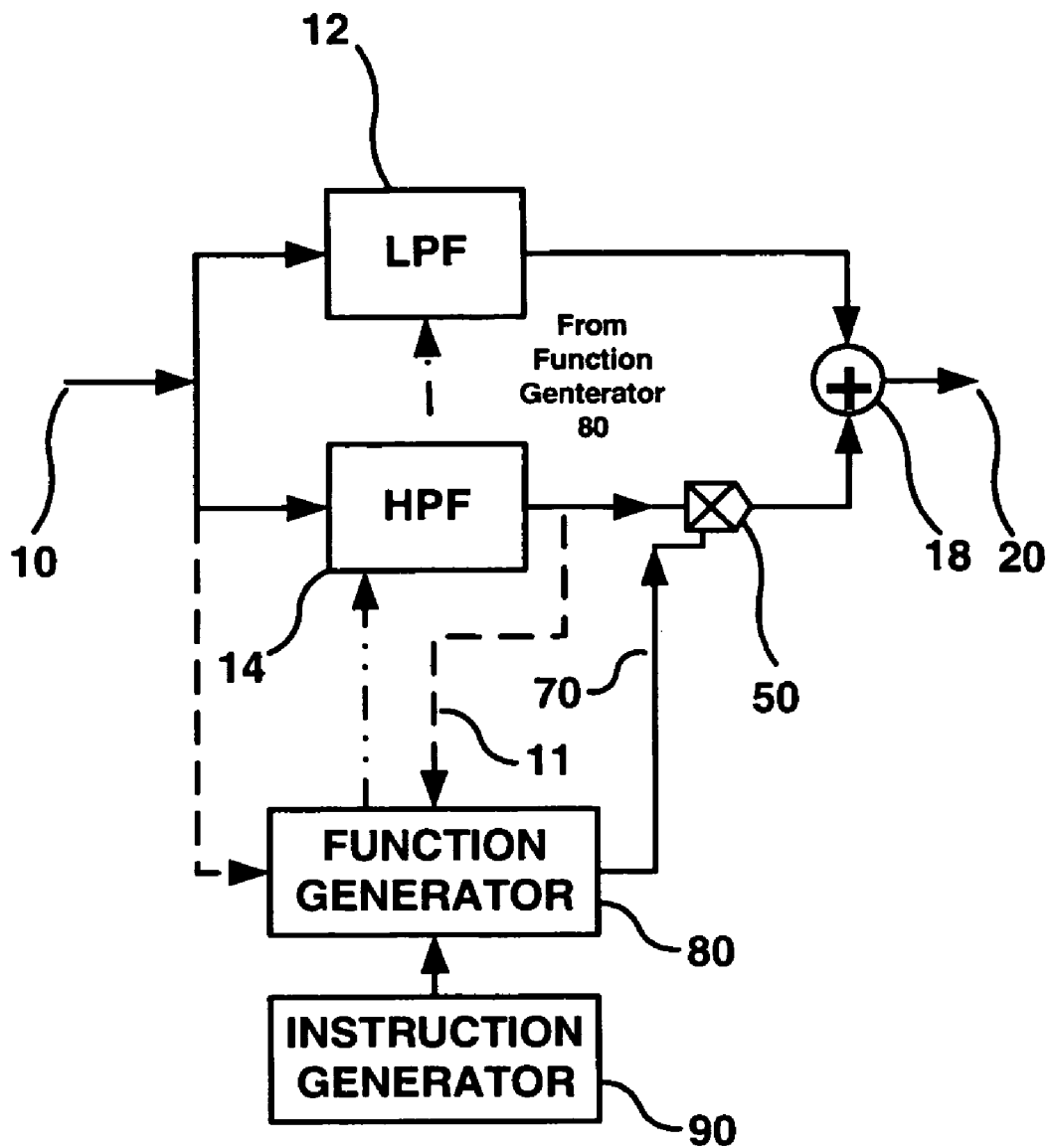
FIG. 5 depicts a second exemplary embodiment exemplary embodiment of a detail enhancement circuit in accordance with the present principles for performing frequency-selective enhancement in response to image content.

FIG. 5 depicts a second exemplary embodiment 100' of a detail enhancement circuit in accordance with the present principles. The detail enhancement circuit 100' of FIG. 5 shares substantially the same structure as the circuit of 100 of FIG. 4 with the following exception. In place of the delay element 22 in the detail enhancement circuit 100 of FIG. 4, the circuit 100' of FIG. 5 includes low-pass filter 12 that is typically complementary to the high pass filter 14. As with the detail enhancement circuit 100 of FIG. 4, the circuit 100' of FIG. 5 can employ various techniques for controlling the element 50. In the simplest scenario, the Function Generator 80 can determine whether or not to apply a fixed level of enhancement to a part of an image. Alternatively, the Function Generator 80 could include a fuzzy logic system responsive operator and/or system-derived inputs. Using fuzzy logic, the Function Generator 80 would apply weighting or other combinatorial processes to determine whether or not to apply a fixed level of enhancement to a part of an image. Either type of control system could be used to apply a variable degree of enhancement to different parts of an image or image sequence. In a further enhancement of the system, the Function Generator 80 can control the high pass and low pass filters 12 and 14, respectively, as indicated by the dashed lines to those filters, to change such characteristics as crossover frequency, bandwidth, and band shaping.

The foregoing describes a technique for achieving image enhancement, preferably by modification of the high-frequency content of an image, although the technique described can readily be applied to any part or parts of a sub-divided spectrum. For example, some images can benefit from a change in amplitude of mid frequencies.

The invention claimed is:

1. Apparatus for enhancing the appearance of details in an image having a frequency spectrum, comprising:
   a separator for separating at least one part of the frequency spectrum of the image from a remaining part of the image;
   an amplitude-changing element for changing the amplitude of said at least one separated part of the frequency spectrum of the image;
   a combiner for combining said changed part of the frequency spectrum of the image with the remaining part of the image, and
   a controller responsive to the content of the image for controlling at least one of: (a) the separator, and (b) the amplitude-changing element to vary the part of the frequency spectrum separated from the remaining part of the image and the amount of the change in amplitude the one separated part prior to said combining, respectively.

2. The apparatus according to claim 1 wherein said separator separates the at least one part of the frequency spectrum of the image in one of a horizontal and a vertical dimension.

3. The apparatus according to claim 1 wherein said separator separates the at least one part of the frequency spectrum of the image in both a horizontal and a vertical dimension.

4. The apparatus according to claim 1 wherein said separator separates the at least one part of the frequency spectrum of the image in a temporal dimension.

5. The apparatus according to claim 1 wherein said separator separates the at least one part of the frequency spectrum of the image in a temporal dimension in combination with separation in at least one of a horizontal dimension and a vertical dimension.

6. The apparatus according to claim 1 wherein said controller spatially varies the control of one of the separator and the amplitude changing element over the area of the image.

7. The apparatus according to claim 1 wherein said controller temporally varies the control of the at least one of the separator and the amplitude changing element during the image.

8. The apparatus according to claim 1 wherein said controller is responsive to the content of at least one of a preceding and succeeding image in an image sequence.

9. The apparatus according to claim 1 wherein the controller is responsive to an operator command.

10. A method for enhancing the appearance of details in an image having a frequency spectrum, comprising the steps of:
    separating at least one part of the frequency spectrum of the image from a remaining part of the image;
    changing the amplitude of said at least one separated part of the frequency spectrum of the image;
    combining said changed part of the frequency spectrum of the image with the remaining part of the image, and
    controlling at least one of: (a) the separation of the one part of the frequency spectrum, and (b) the change in amplitude at least in part in response to the content of the image to vary at least the part of the frequency spectrum separated from the remaining part of the image and the amount of the change in the amplitude the one separated part, respectively, prior to said combining.

11. The method according to claim 10 wherein said separating step further comprises the step of separating the at least one part of the frequency spectrum of the image in one of a horizontal and a vertical dimension.

12. The method according to claim 10 wherein said separating step further comprises the step of separating the at least one part of the frequency spectrum of the image in both a horizontal and a vertical dimension.

13. The method according to claim 10 wherein said separating step further comprises the step of separating the at least one part of the frequency spectrum of the image in a temporal dimension.

14. The method according to claim 10 wherein said separating step further comprises the step of separating the at least one part of the frequency spectrum of the image in a temporal dimension in combination with separation in at least one of a horizontal dimension and a vertical dimensions.

15. The method according to claim 10 wherein the controlling step further comprises the step of spatially varying the control of least one of the separation of the one part of the frequency spectrum and the change in amplitude.

16. The method according to claim 10 wherein the controlling step further comprises the step of temporally varying the control of the at least one of the separator and the amplitude changing element over the duration of the image.

17. The method according to claim 10 wherein the controlling step further includes the step of controlling the at least one of the separation of the one part of the frequency spectrum and the change in amplitude said controller responsive to the content of at least one of a preceding and succeeding image in an image sequence.

18. The method according to claim 10 wherein the controlling step further includes the step of controlling the at least one of the separation of the one part of the frequency spectrum and the change in amplitude said controller responsive to an operator command.

19. The apparatus of claim 1, wherein said controller further comprises a function generator configured to receive the image and generate a control signal responsive to content of the image, said control signal operating as an input to the amplitude changing element.

20. The method of claim 10, wherein said controlling further generating a control signal from a function generator in response to content of the image, said control signal operating to change the amplitude of said at least one separate part of the frequency spectrum of the image.

* * * * *